(12) United States Patent
Cai et al.

(10) Patent No.: US 9,234,617 B2
(45) Date of Patent: *Jan. 12, 2016

(54) LEAKAGE FREE PIPE FITTING OF QUICK CONNECTION FOR REVERSE OSMOSIS MEMBRANE (RO) WATER TREATMENT UNIT OF HOUSEHOLD

(76) Inventors: Ying Lin Cai, Guangdong (CN); Chao Fou Hsu, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/562,461

(22) Filed: Jul. 31, 2012

(65) Prior Publication Data

US 2013/0069361 A1   Mar. 21, 2013

(30) Foreign Application Priority Data

Sep. 20, 2011   (CN) .................... 2011 2 0353378 U

(51) Int. Cl.
*F16L 37/091* (2006.01)
*F16L 37/092* (2006.01)

(52) U.S. Cl.
CPC .................. *F16L 37/0925* (2013.01)

(58) Field of Classification Search
USPC ............ 285/319, 133.11, 133.21, 133.5, 243, 285/322–323
See application file for complete search history.

(56) References Cited

U.S. PATENT DOCUMENTS

| | | | |
|---|---|---|---|
| 4,601,497 A * | 7/1986 | Bartholomew | 285/319 |
| 4,637,636 A * | 1/1987 | Guest | 285/38 |
| 4,681,351 A * | 7/1987 | Bartholomew | 285/319 |
| 4,712,810 A | 12/1987 | Pozzi | |
| 4,736,968 A | 4/1988 | Glegg | |
| 4,905,964 A * | 3/1990 | Shiozaki | 251/149.6 |
| 4,923,228 A * | 5/1990 | Laipply | 285/319 |
| 5,201,213 A | 4/1993 | Henning | |
| 6,019,348 A | 2/2000 | Powell | |
| 7,419,191 B2 | 9/2008 | Shu | |

* cited by examiner

*Primary Examiner* — Aaron Dunwoody
*Assistant Examiner* — Fannie Kee
(74) *Attorney, Agent, or Firm* — Bacon & Thomas, PLLC

(57) ABSTRACT

A leakage-free pipe fitting of quick connection for Reverse Osmosis Membrane (RO) water treatment unit of household has a pipe fitting, a sealing O-ring, an annular cooperative bushing collar, a cylindrical elastic sleeving collet, an accessory latching clip with a cantilevered lug, and an annular reinforcing bolster with an inner bore. The annular reinforcing bolster is inserted into the cylindrical retainer of the pipe fitting sandwiched between the sealing O-ring and the bottom surface of the cylindrical elastic sleeving collet.

3 Claims, 19 Drawing Sheets

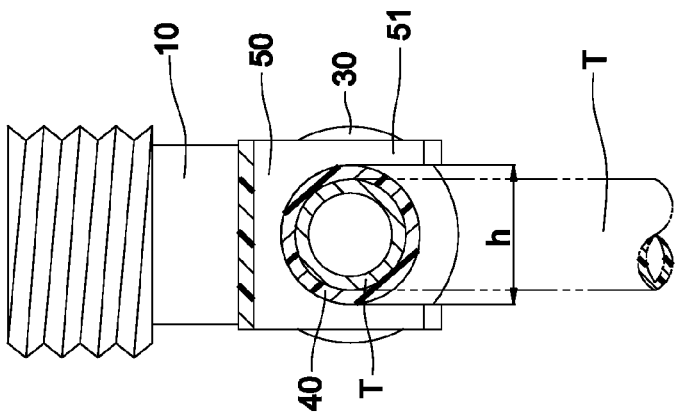
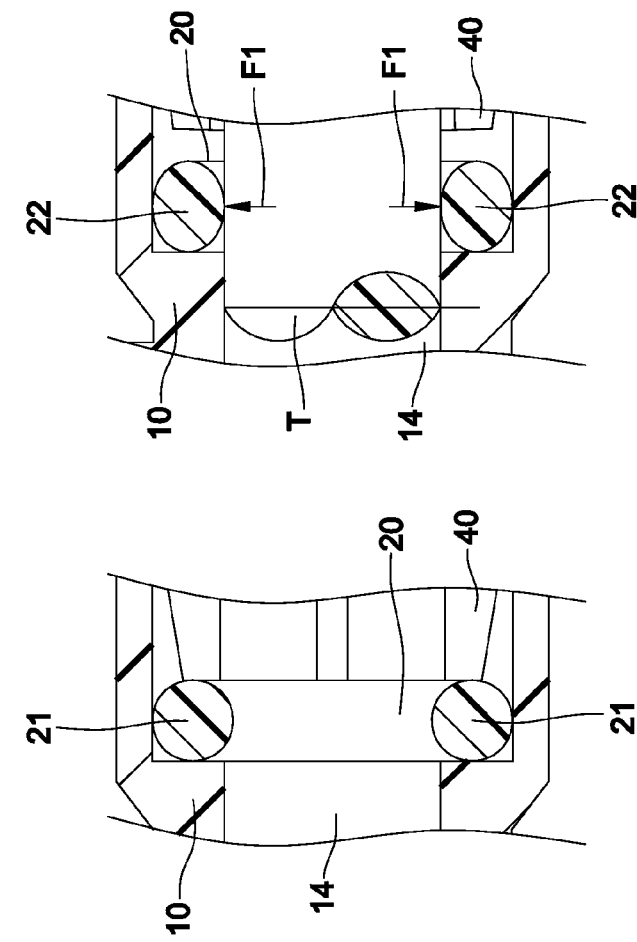

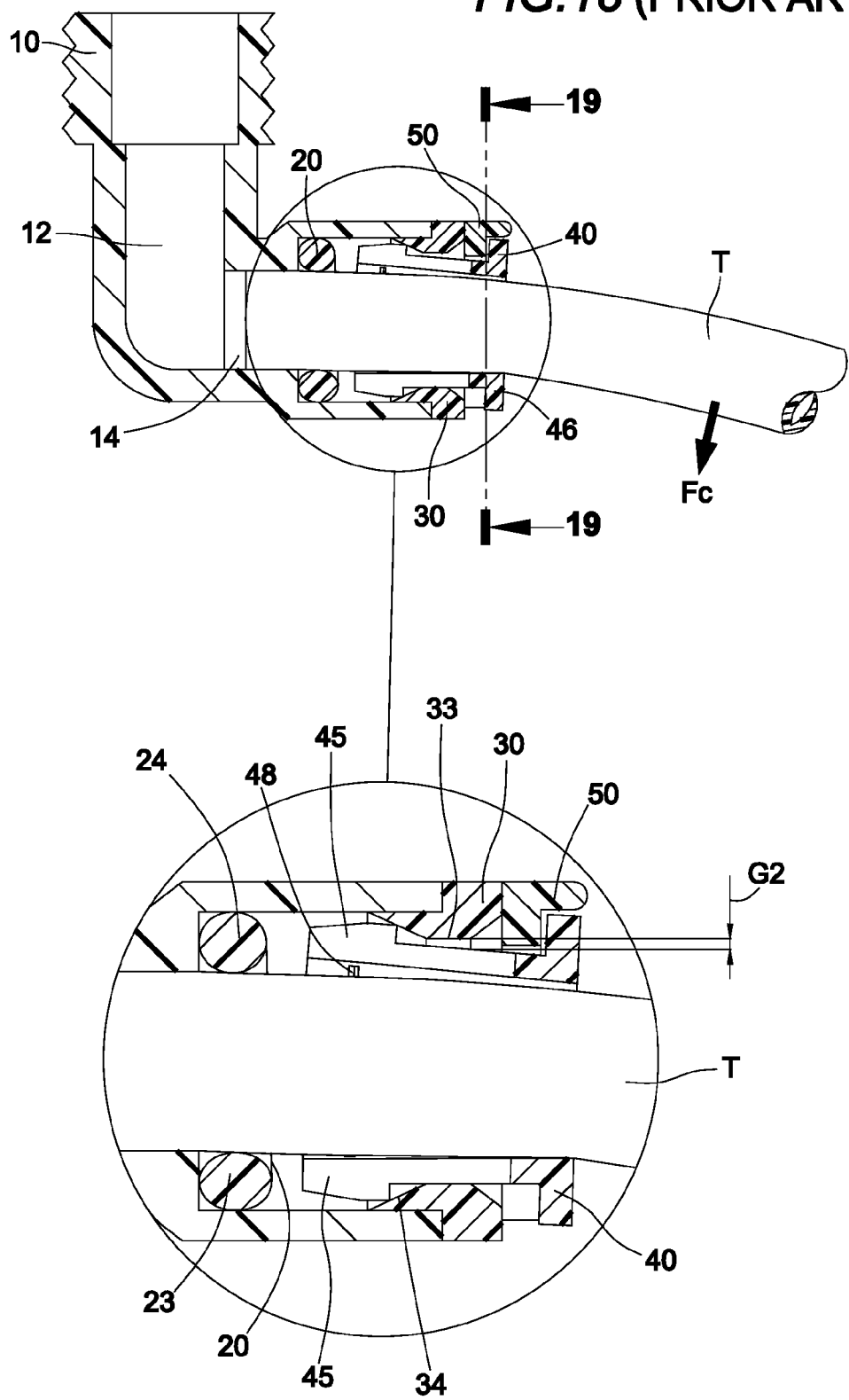

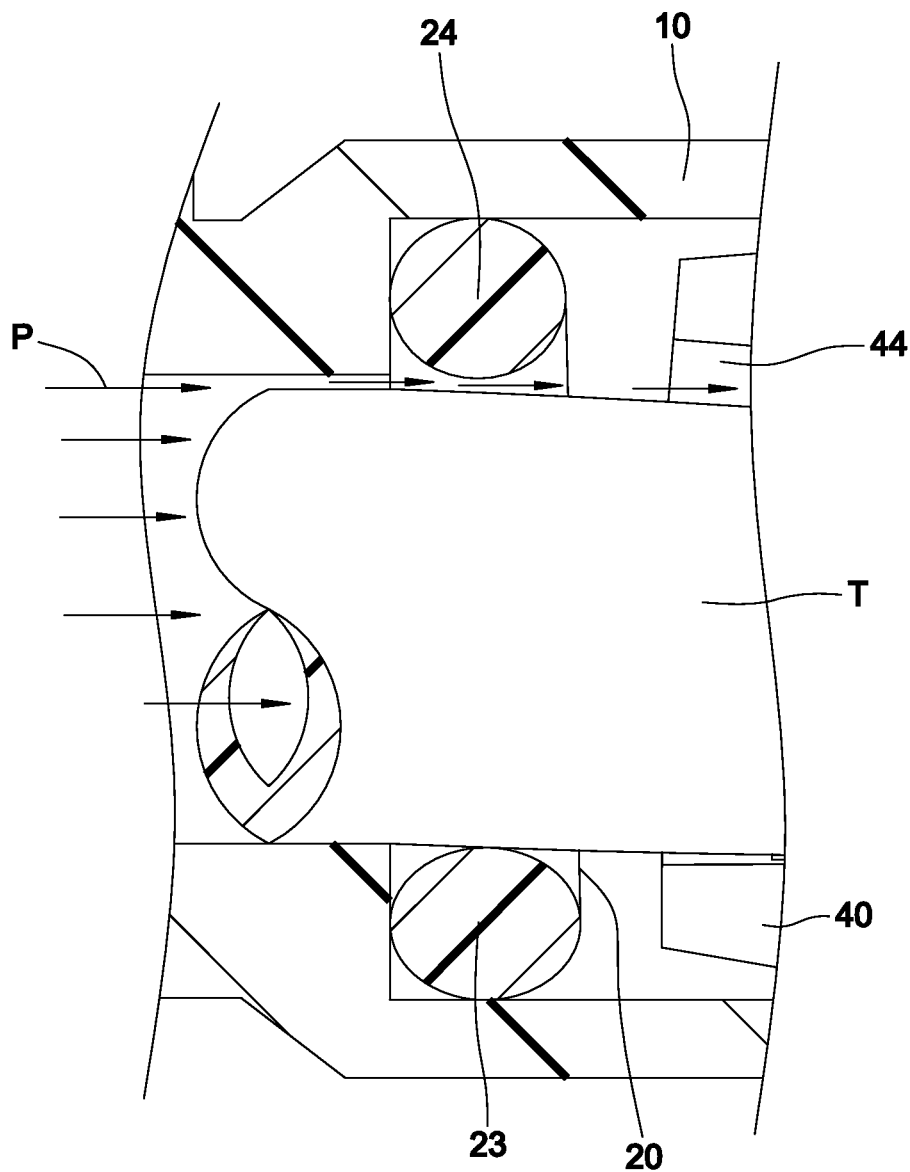
FIG.18-a (PRIOR ART)

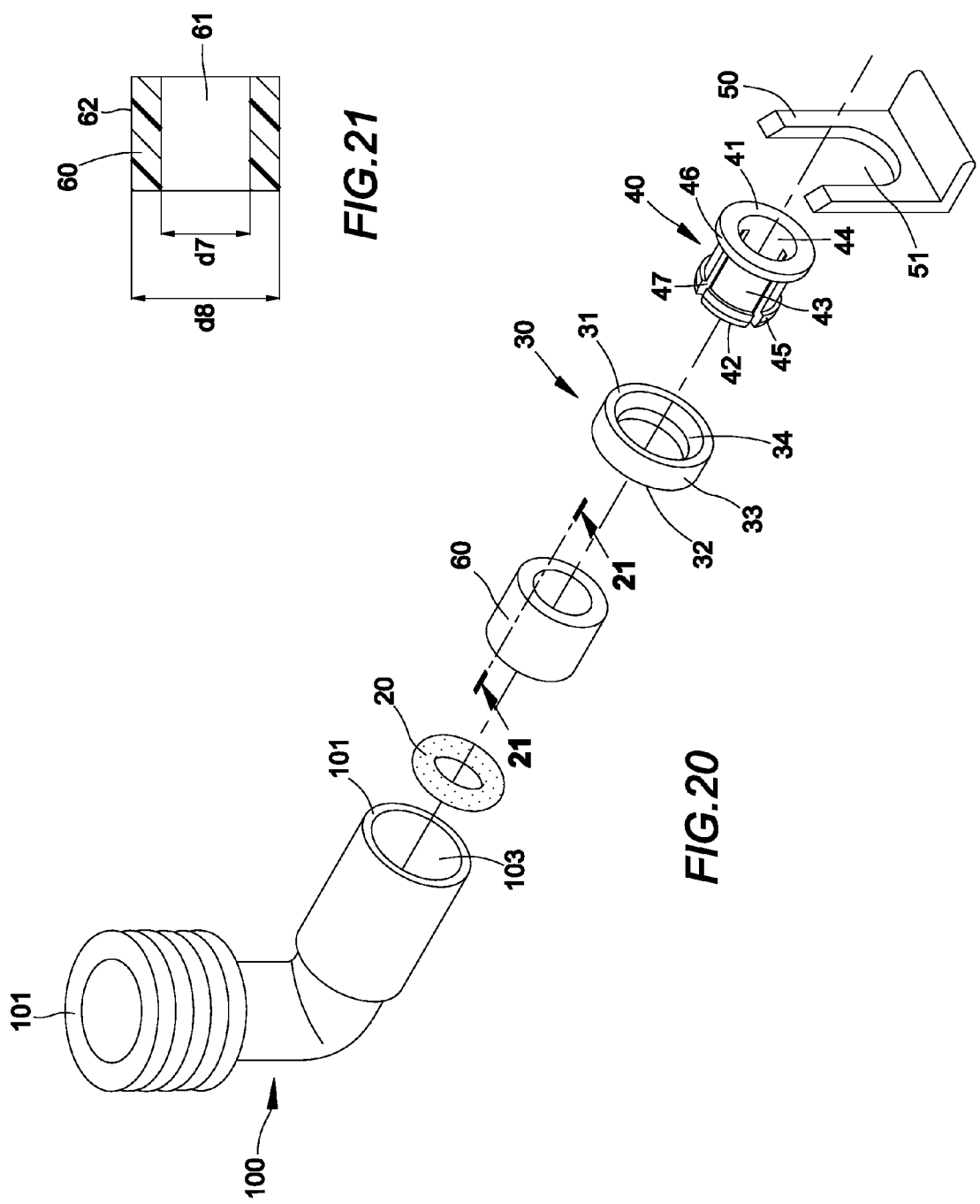

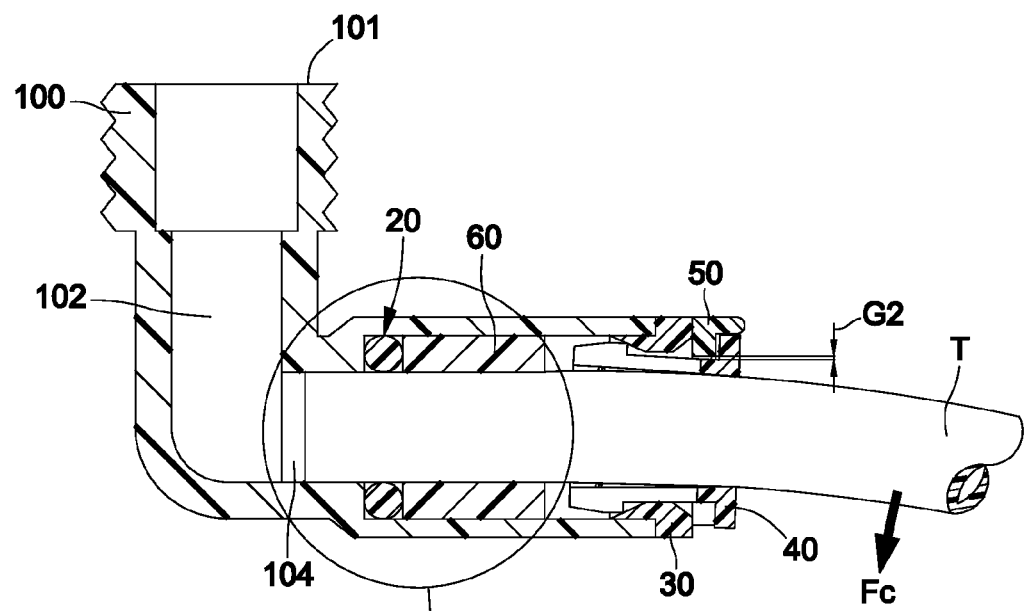
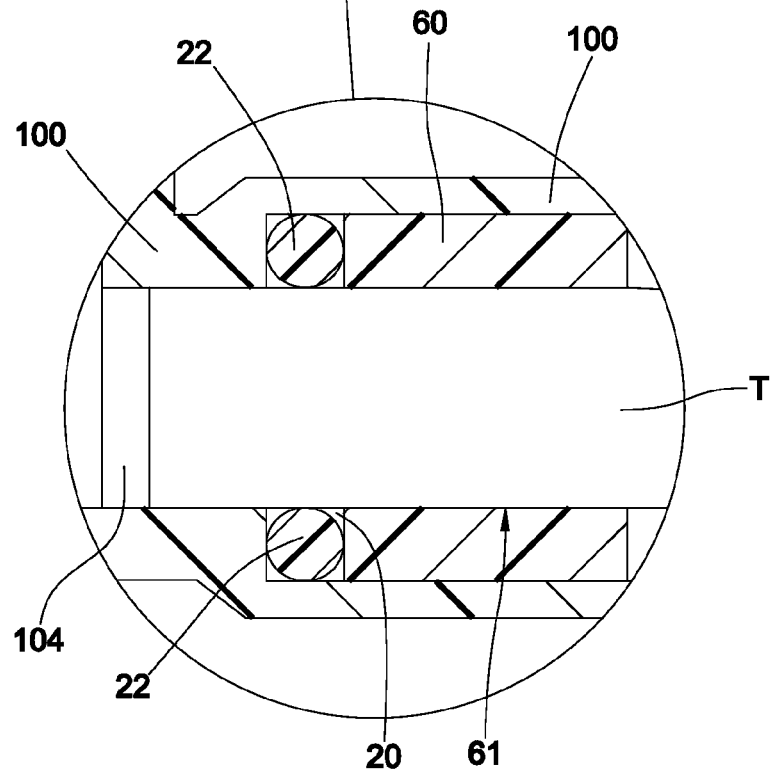
FIG.30

LEAKAGE FREE PIPE FITTING OF QUICK CONNECTION FOR REVERSE OSMOSIS MEMBRANE (RO) WATER TREATMENT UNIT OF HOUSEHOLD

The present invention relates to a "leakage-free pipe fitting of quick connection" for Reverse Osmosis Membrane (RO) water treatment unit of household, particularly for a leakage-resistant device for the plumbing pipe fitting of inserting type with quick connection. Even if the water pipe is badly bent, the leakage-free effect for the pipe fitting still can ensure no compressed water is leaked out.

Therefore, it prevents the RO water treatment unit from the leakage of compressed water therein due to water pipe being badly bent.

BACKGROUND OF THE INVENTION

Owing to people pay much attention to the drinking water of daily life, the purchasing rate for the Reverse Osmosis Membrane (RO) water treatment unit of household is constantly soaring. As a result, the selling volume in the market is directly reflected in increasing manner. Accordingly, for the purpose of increasing production quantity and decreasing assembly laboring cost, manufacturers of the RO water treatment unit convert the traditional pipe fittings of threaded type with much more laboring hour in the plumbing task into pipe fittings of inserting type with less laboring hour in the plumbing task. According to current status, the plumbing task for the pipe fittings of threaded type takes three seconds while the plumbing task for the pipe fittings of inserting type only takes one second. Thus, the laboring hour for the former is triple of the laboring hour for the later.

The structure of the pipe fittings of inserting type is shown as in the FIGS. 1 and 8, which comprises a pipe fitting 10, a sealing O-ring 20, an annular cooperative bushing collar 30, a cylindrical elastic sleeving collet 40 and an accessory latching clip 50 with L-shaped pelvic lug, wherein:

Said pipe fitting 10, which is unitarily extruded in one piece by plastics molding into tubular fitting with two coupling unions 11 (FIG. 2) or tubular T-shaped fitting with three coupling unions 11 (FIG. 3), includes a hollow water passage 12, a cylindrical retainer 13 and a cylindrical docking receptacle 14 such that one coupling union 11 encloses the cylindrical retainer 13 therein while the circumferences of the rest coupling unions 11 have male threads formed thereon, and the cylindrical docking receptacle 14 runs through the cylindrical retainer 13 in communicable with the hollow water passage 12;

Said sealing O-ring 20 is made of rubber to be inserted against the inner bottom wall of the cylindrical retainer 13 in the pipe fitting 10 such that whose outer diameter equals the internal diameter of the cylindrical retainer 13 in the pipe fitting 10 while whose internal diameter is slightly less than the internal diameter of the cylindrical docking receptacle 14 in the pipe fitting 10;

Said annular cooperative bushing collar 30, which is unitarily extruded in one piece by plastics molding into two-stair tiered hollow cylinder to be partially slid into the coupling union 11 on the cylindrical retainer 13 of the pipe fitting 10 by means of glue-bonding or high frequency melt-bonding method, includes a top surface 31, a bottom surface 32, a jointing circular through-hole 33 running through the top surface 31 and bottom surface 32, and a guiding conical flare 34 respectively created along each rim of the top surface 31 and bottom surface 32 such that the outer diameter of top stair rim abutting top surface 31 is greater than the outer diameter of bottom stair rim abutting bottom surface 32 (FIG. 4);

Said cylindrical elastic sleeving collet 40, which is unitarily extruded in one piece by plastics molding into hollow cylinder to be slid into the jointing circular through-hole 33 of the annular cooperative bushing collar 30, includes a peripheral gorgerin 43 integrating a top surface 41 and a bottom surface 42 with a circular sliding through hole 44 running through therein, an annular cambered locking flange 45 abutting the bottom surface 42 and an annular delimiting flange 46 abutting the top surface 41 as well as a plurality of longitudinal hooping slits 47 created along the bottom surface 42 in circumferentially equivalent-spaced manner towards the top surface 41 to be communicable with the circular sliding through hole 44, and a plurality of elastic griping ribs 48 created between two adjacent longitudinal hooping slit 47 in circumferentially equivalent-spaced manner, wherein the outer diameter $d_1$ of the peripheral gorgerin 43 is smaller than the internal diameter $d_2$ of the jointing circular through-hole 33 in the annular cooperative bushing collar 30, the outer diameter $d_3$ of the annular cambered locking flange 45 is greater than the internal diameter $d_2$ of the jointing circular through-hole 33 in the annular cooperative bushing collar 30 and the outer diameter $d_4$ of the annular delimiting flange 46 is greater than the internal diameter $d_3$ of the annular cambered locking flange 45 (FIGS. 4 and 6); and Said accessory latching clip 50, which is unitarily extruded in one piece by plastics molding into planiform collar served as clamping means for assembled pipe fitting, includes a U-shaped nick 51 with two prong of appendix legs encompassing central cut nick such that the width h between two legs of the U-shaped nick 51 is slightly greater than the outer diameter $d_1$ of the peripheral gorgerin 43 in the cylindrical elastic sleeving collet 40 (FIG. 8).

Please further refer to FIGS. 9 through 13. The assembling steps of the foregoing conventional pipe fittings of inserting type are shown as below.

a. Insert the sealing O-ring 20 into the cylindrical retainer 13 in the pipe fitting 10 to the thorough end such that the sealing O-ring 20 contacts against the inner bottom wall of the cylindrical retainer 13 (FIGS. 10 and 11).

b. Facing the bottom surface 32 of the annular cooperative bushing collar 30 towards the cylindrical retainer 13 of the pipe fitting 10, insert the annular cooperative bushing collar 30 into the cylindrical retainer 13 of the pipe fitting 10 (FIG. 11), then securely fix the annular cooperative bushing collar 30 onto the coupling union 11 of the pipe fitting 10 by means of glue-bonding or high frequency melt-bonding method (FIG. 12).

c. Facing the bottom surface 42 of the cylindrical elastic sleeving collet 40 towards the jointing circular through-hole 33 of the annular cooperative bushing collar 30, forcibly push the annular cambered locking flange 45 of the cylindrical elastic sleeving collet 40 forwardly to pass it through the jointing circular through-hole 33 of the annular cooperative bushing collar 30 to finish the assembly of the conventional pipe fittings of inserting type (FIGS. 9 and 13). At this moment, a clearance G1 is created because the outer diameter $d_1$ of the peripheral gorgerin 43 in the cylindrical elastic sleeving collet 40 is less than the internal diameter $d_2$ of the jointing circular through-hole 33 in the annular cooperative bushing collar 30 (FIG. 13 and associated partially magnified view) so that the cylindrical elastic sleeving collet 40 is free to move to and fro in the jointing circular through-hole 33 of the annular cooperative bushing collar 30 without possibility for the cylindrical elastic sleeving collet 40 being slipped out of the annular cooperative bushing collar 30 under the confinement of the annular cambered locking flange 45 because the outer diameter d3 of the annular cambered locking flange 45 in the cylindrical elastic sleeving collet 40 is greater than the internal diameter d2 of the jointing circular through-hole 33 in the annular cooperative bushing collar 30.

Please refer to FIGS. 14 through 18, 14-a and 15-a. The mutually jointing steps between the foregoing conventional pipe fittings of inserting type and the water pipe are shown as below.

A. Align and insert a water pipe T into the circular sliding through hole 44 in the top surface 41 of the cylindrical elastic sleeving collet 40 (FIG. 14), then force the water pipe T orderly pass through the circular sliding through hole 44 of the cylindrical elastic sleeving collet 40 and the inner bore of the sealing O-ring 20 up to the cylindrical docking receptacle 14 of the pipe fitting 10 (FIG. 15). At this moment, the water pipe T is firmly sleeved by the elastic griping ribs 48 of the circular sliding through hole 44 in the cylindrical elastic sleeving collet 40, and the sealing O-ring 20 is under symmetrically isometric deformed by the compressing force F1 caused by the outer wall of the water pipe T so that a leakage-free effect due to closely contact between the water pipe T and the cylindrical docking receptacle 14 of the pipe fitting 10 is created, wherein (FIG. 15-a) is a cross sectional view showing a symmetrically isometric deformation 22 of the sealing O-ring 20, which becomes oval shape, while (FIG. 14-a) is a cross sectional view showing no symmetrically isometric deformation 21 of the sealing O-ring 20, which is round shape.

B. hold exposed section of the water pipe T outside of the cylindrical elastic sleeving collet 40, then pull it outwards along the top surface 41 of the cylindrical elastic sleeving collet 40 so that the cylindrical elastic sleeving collet 40 with annular delimiting flange 46 is simultaneously drawn outwards with a certain displacement force F due to securely clamping of the cylindrical elastic sleeving collet 40 onto the outer wall of the water pipe T (FIG. 16). At this moment, the annular cambered locking flange 45 of the cylindrical elastic sleeving collet 40 is forced to glide into the guiding conical flare 34 of bottom stair rim abutting bottom surface 32 of the jointing circular through-hole 33 in the annular cooperative bushing collar 30 so that an enhanced clamping action of the cylindrical elastic sleeving collet 40 onto the outer wall of the water pipe T is obtained because the annular cambered locking flange 45 is inwardly squeezed by the guiding conical flare 34. Thereby, the outwardly drawn annular delimiting flange 46 detaches off the annular cooperative bushing collar 30 to create a clearance G against the top surface 31 of the annular cooperative bushing collar 3 with same displacement as that of the cylindrical elastic sleeving collet 40 (FIG. 16 and associated partially magnified view).

C. Align the U-shaped nick 51 of the accessory latching clip 50 with the clearance G between the annular delimiting flange 46 of the cylindrical elastic sleeving collet 40 and the top surface 31 of the annular cooperative bushing collar 30, then thoroughly inset the accessory latching clip 50 up to the inner hemispherical bottom of the U-shaped nick 51 contacts against the peripheral gorgerin 43 of the cylindrical elastic sleeving collet 40 so that the cylindrical elastic sleeving collet 40 is tightly fixed in stable manner with no moving possibility to complete the mutually jointing procedure between the foregoing conventional pipe fittings of inserting type and the water pipe T (FIG. 17).

Please further refer to FIGS. 18, 19, 14-a, 15-a and 18-a. Because all parts related to Reverse Osmosis Membrane (RO) water treatment unit such as filter cartridge, Reverse Osmosis Membrane (RO), plumbing fitting, plumbing pipe and so on must be mounted nearby the RO water treatment unit so that the spaces among all these parts must be closely arranged with bending water pipe to effectively employ Limited space confined by the RO water treatment unit.

If the water pipe T is bent towards the opening of the U-shaped nick 51 in the accessory latching clip 50 by a bending force Fc (FIGS. 18 and 19), the annular delimiting flange 46 of the cylindrical elastic sleeving collet 40 is borne uneven stress from the water pipe T, namely a partial section of the annular delimiting flange 46, which is corresponding to the opening of the U-shaped nick 51, will lose support from the accessory latching clip 50 and result in no counteraction to the bending force Fc. Accordingly, the peripheral gorgerin 43 is also borne uneven stress from the water pipe T with result that a partial section of the peripheral gorgerin 43 in corresponding to the arrowhead of bending force Fc will closely contact with the inner wall of the jointing circular through-hole 33 while another partial section of the peripheral gorgerin 43 in opposed to the arrowhead of bending force Fc will detach the inner wall of the jointing circular through-hole 33 to create a gap G2 (FIG. 18 and associated partially magnified view). Thereby, due to the bent water pipe T, the deformation of the sealing O-ring 20 will be changed from original symmetrically isometric deformation 22 (FIG. 15-a) into undesired asymmetrically non-isometric deformation 23, 24 (FIG. 18-a).

In other words, the deformation of a partial section of the sealing O-ring 20 in corresponding to the arrowhead of bending force Fc will be increased as shown in asymmetrically non-isometric deformation 23 (FIG. 18-a) while the deformation of another partial section of the sealing O-ring 20 in opposed to the arrowhead of bending force Fc will be decreased as shown in asymmetrically non-isometric deformation 24 (FIG. 18-a). Thus, the sealing effect of the sealing O-ring 20 over the outer wall of the water pipe T becomes defectively uneven. For comparison of sealing effect in efficiency order, the asymmetrically non-isometric deformation 23 is better than the symmetrically isometric deformation 22 while the symmetrically isometric deformation 22 is better than the asymmetrically non-isometric deformation 24. Under normal water pressure of exceeding 80 psi in the water pipe T of general RO water treatment unit with degraded plastics parts from aging effect incurred by the hot expansion and cold shrinkage of the seasonal temperature fluctuation, the compressed water P in the water pipe T will seep out via partial section of bad sealing effect between the outer wall of the water pipe T and the bad deformation of the sealing O-ring 20 like the asymmetrically non-isometric deformation 24 in FIG. 18-a. Consequently, the seeping compressed water P will leak out of the cylindrical elastic sleeving collet 40 via the circular sliding through hole 44 of the cylindrical elastic sleeving collet 40 and gradually spread over the circuit cabling or compressed pump of the RO water treatment unit to damage the overall RO water treatment unit into functionless manner, or even worse to cause safety accident due to electric leakage. All such serious results are incurred by the leakage drawback in the water pipe fitting of quick connection. Therefore, how to solve the leakage drawback in the water pipe fitting of quick connection becomes an urgent issue for the manufacturers of the RO water treatment unit.

SUMMARY OF THE INVENTION

The primary object of the present invention is to provide a "leakage-free pipe fitting of quick connection" for Reverse Osmosis Membrane (RO) water treatment unit of household, which comprises a pipe fitting, a sealing O-ring, an annular cooperative bushing collar, a cylindrical elastic sleeving collet, an accessory latching clip with a cantilevered lug, and an annular reinforcing bolster with an inner bore. The annular reinforcing bolster is inserted into the cylindrical retainer of the pipe fitting in sandwich between the sealing O-ring and the bottom surface of the cylindrical elastic sleeving collet.

By means of the annular reinforcing bolster, the water pipe inserted is closely propped and sleeved in symmetrical manner without causing bad uneven sealing effect incurred by the asymmetrically non-isometric deformation of the sealing O-ring.

Even if the water pipe is badly bent, the leakage-free effect for the pipe fitting still can ensure no compressed water is leaked out.

BRIEF DESCRIPTION OF THE DRAWINGS

FIG. 4 is a cross sectional view taken from the 4-4 section line of previous FIG. 1 for showing an annular cooperative bushing collar.

FIG. 14-a is a cross sectional view showing the morphological status of sealing O-ring in a conventional pipe fitting before being deformed by compressing force.

FIG. 15-a is a cross sectional view showing the morphological status of scaling O-ring in a conventional pipe fitting after being deformed by compressing force.

FIG. 18 is a cross section schematic view showing the morphological status of coupled water pipe with conventional pipe fitting during being deformed by bending force.

FIG. 18-a is a cross section schematic view showing the morphological status of coupled water pipe with conventional pipe fitting with leakage of compressed water therein after being deformed by bending force.

FIG. 19 is a cross sectional view taken from the 19-19 section line of previous FIG. 18.

FIG. 20 is an exploded perspective schematic view for a pipe fitting in the present invention.

FIG. 21 is a cross sectional, view taken from the 21-21 section line of previous FIG. 20 for showing an annular reinforcing bolster of the present invention.

FIG. 30 is a cross section schematic view showing the morphological status of coupled water pipe in a pipe fitting of the present invention during being deformed by bending force.

DETAILED DESCRIPTION OF THE PREFERRED EMBODIMENTS

Figure 1:
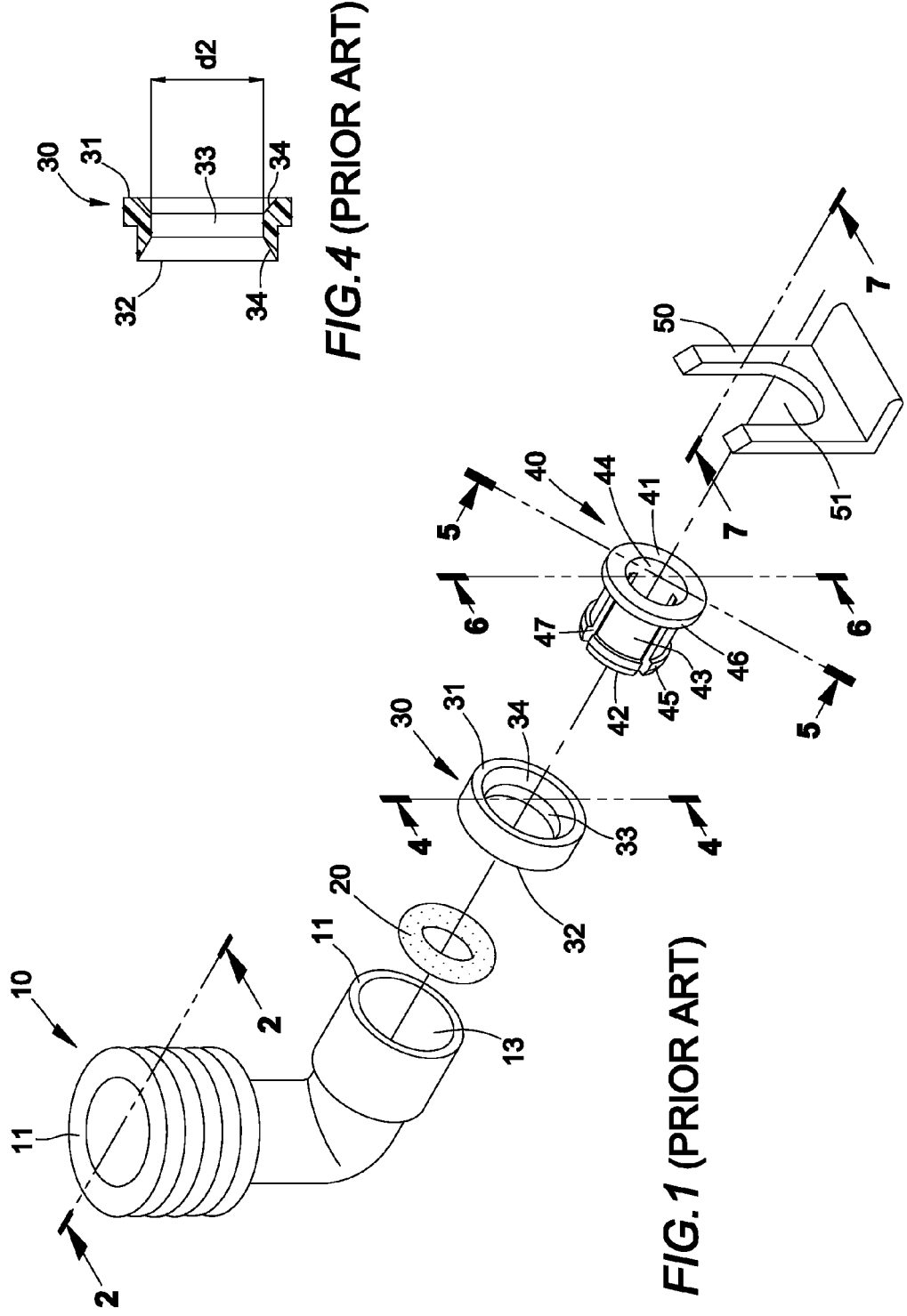
FIG. 1 is an exploded perspective schematic view for the conventional pipe fitting.
Figure 2:
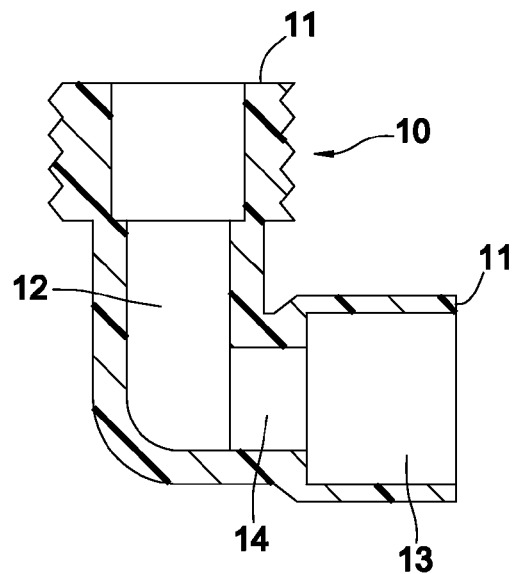
FIG. 2 is a cross sectional view taken from the 2-2 section line of previous FIG. 1 for showing a pipe fitting.
Figure 6:
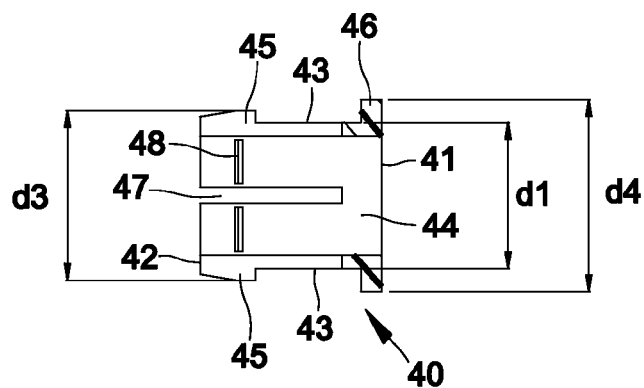
FIG. 6 is a cross sectional view taken from the 6-6 section line of previous FIG. 1 for showing the cylindrical elastic sleeving collet.
Figure 7:
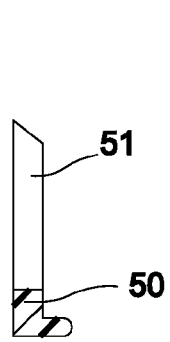
FIG. 7 is a cross sectional view taken from the 6-6 section line of previous FIG. 1 for showing an accessory latching clip.
Figure 8:
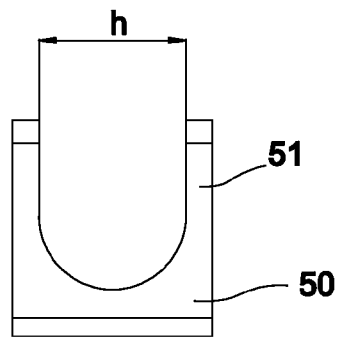
FIG. 8 is a frontal view for showing the accessory latching clip in the conventional pipe fitting.
Figure 9:
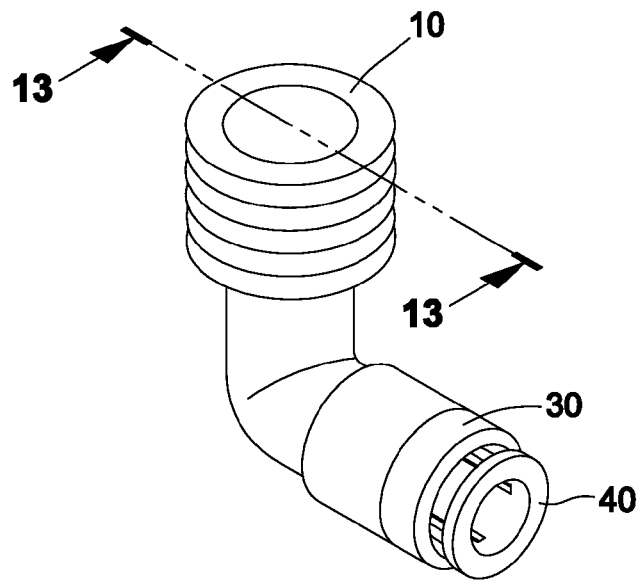
FIG. 9 is a perspective assembly view for the conventional pipe fitting.
Figure 10:
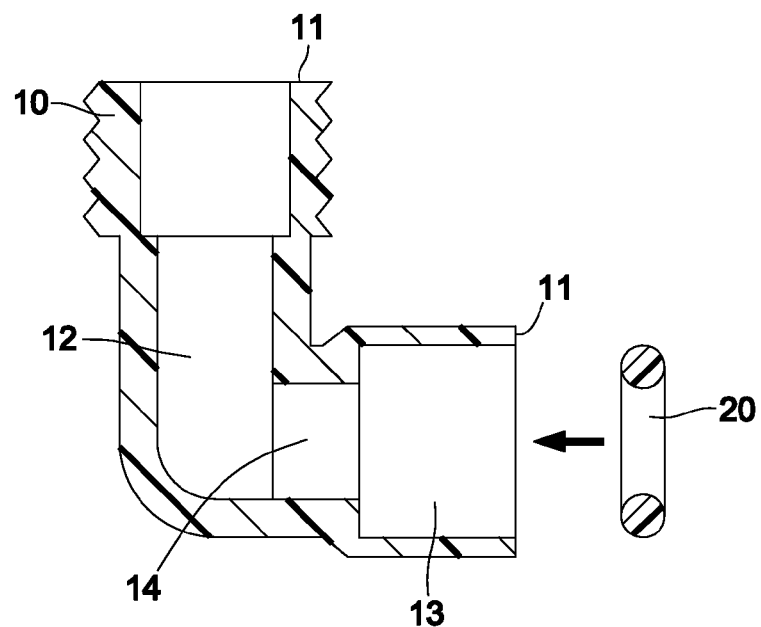
FIG. 10 is the first assembly view for the conventional pipe fitting.
Figure 11:
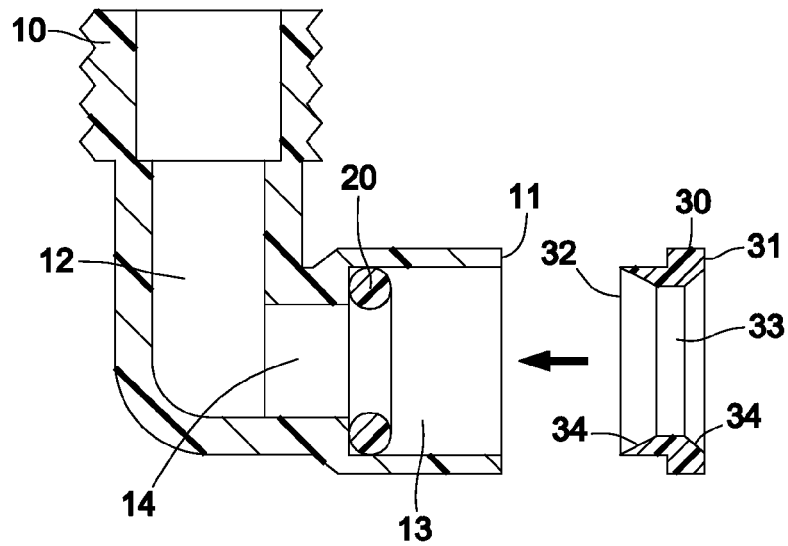
FIG. 11 is the second assembly view for the conventional pipe fitting.
Figure 12:
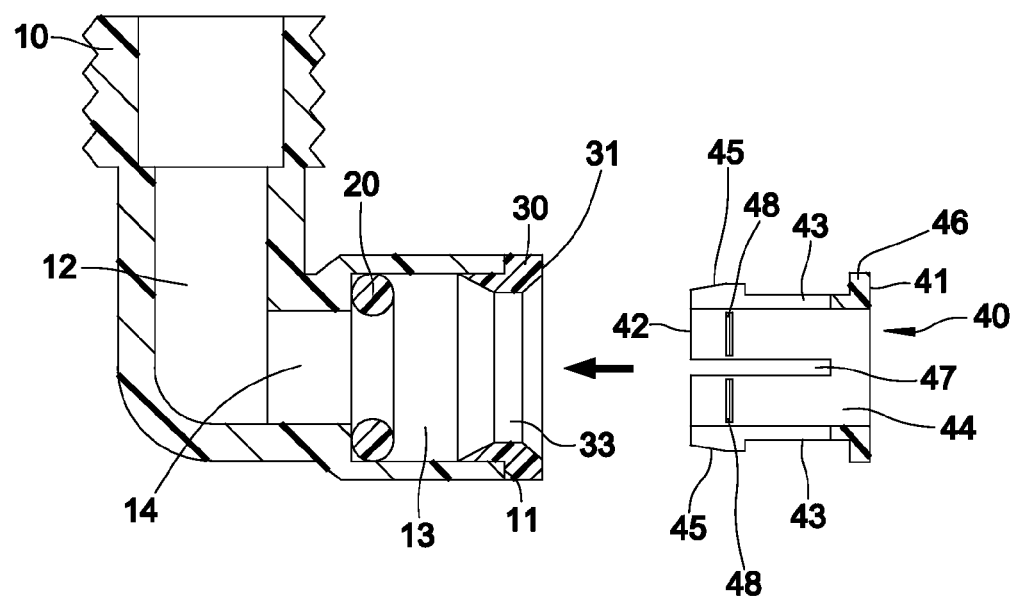
FIG. 12 is the third assembly view for the conventional pipe fitting.
Figure 13:
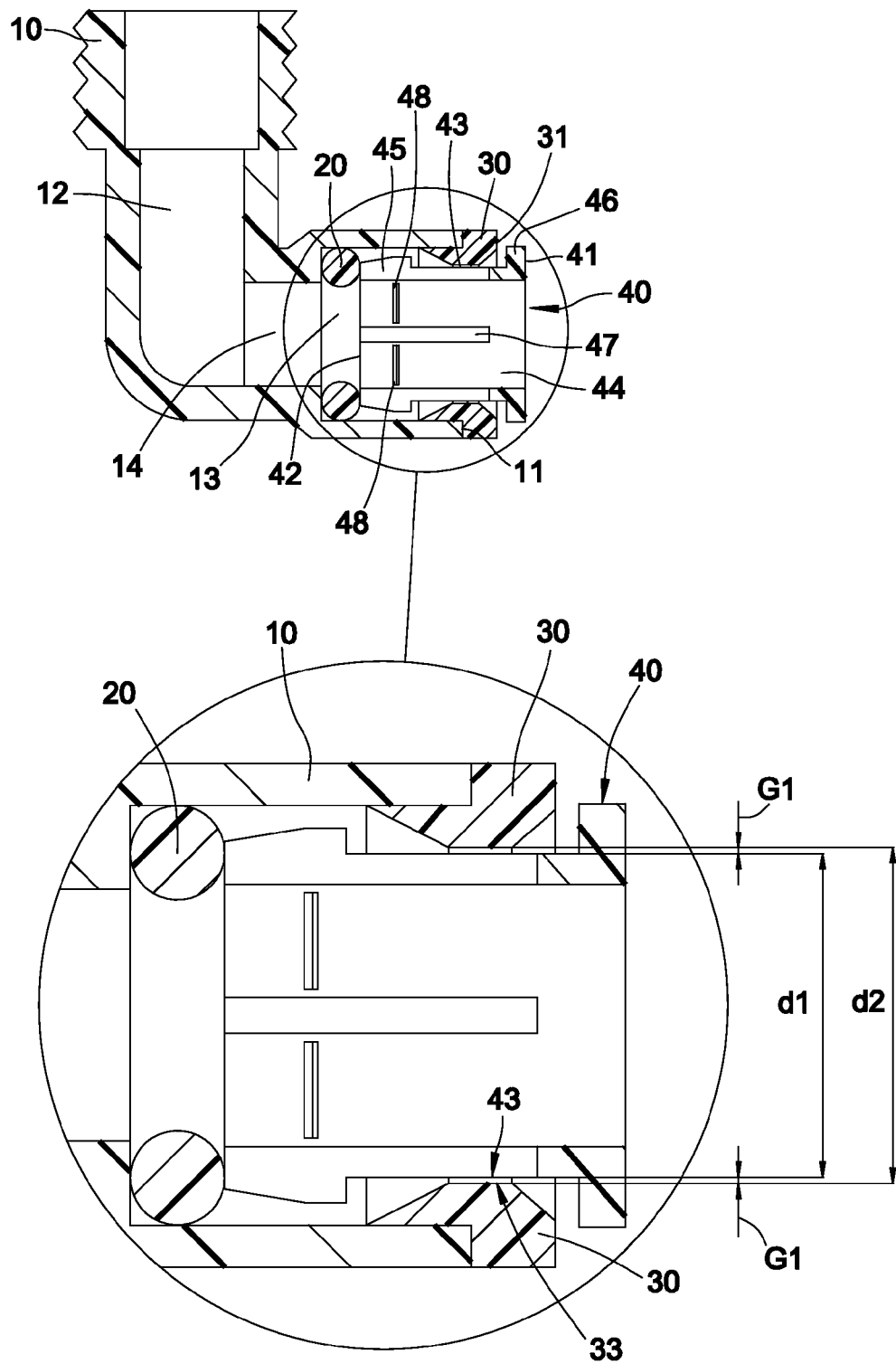
FIG. 13 is the fourth assembly view for the conventional pipe fitting.
Figure 14:
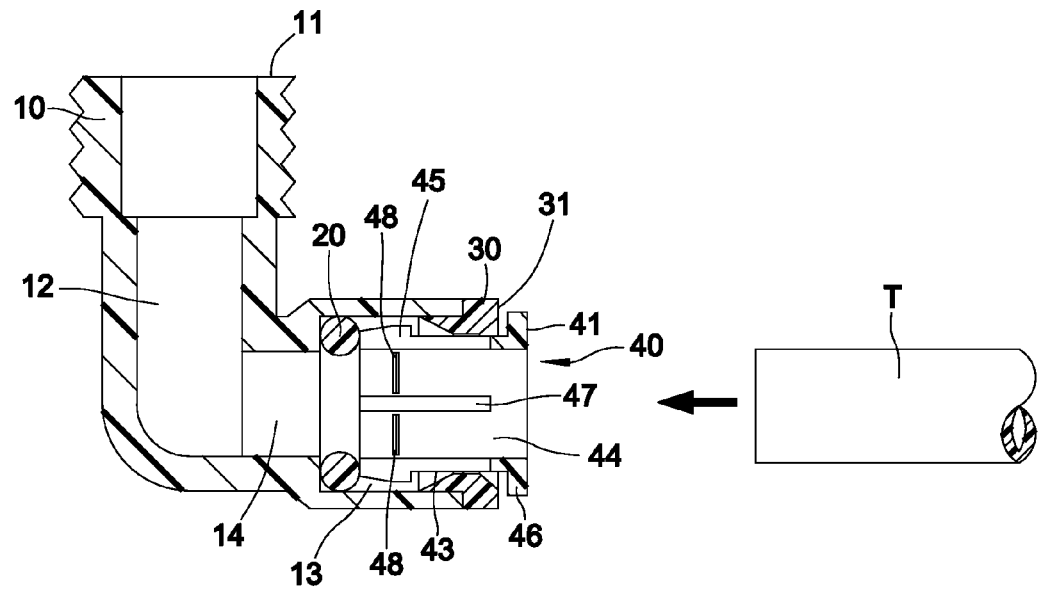
FIG. 14 is the first schematic view showing the coupling of water pipe with conventional pipe fitting.
Figure 23:
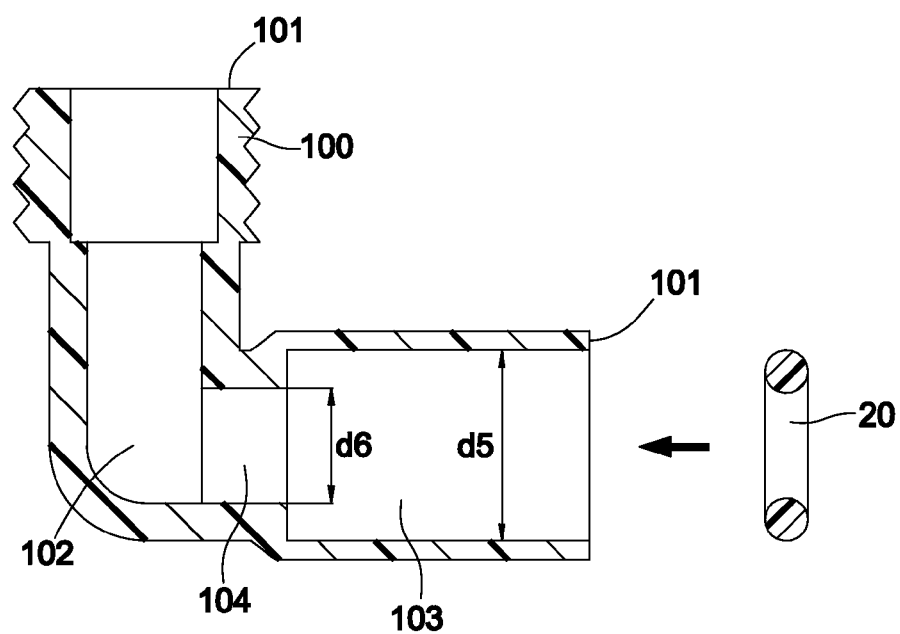
FIG. 23 is the first assembly view for a pipe fitting in the present invention.
Figure 24:
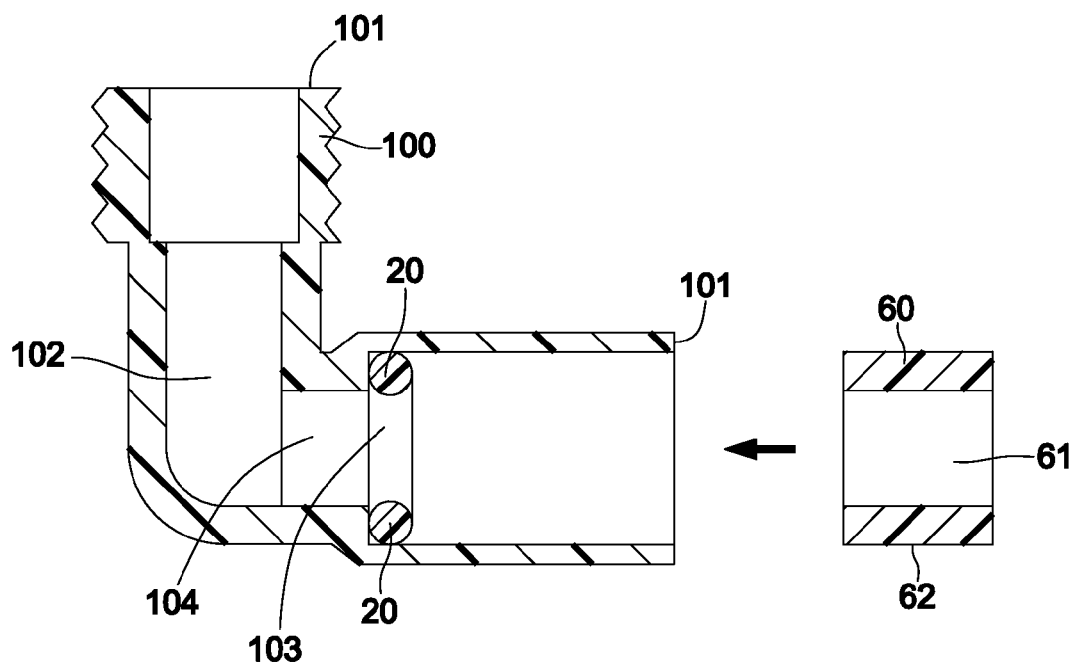
FIG. 24 is the second assembly view for a pipe fitting in the present invention.
Figure 25:
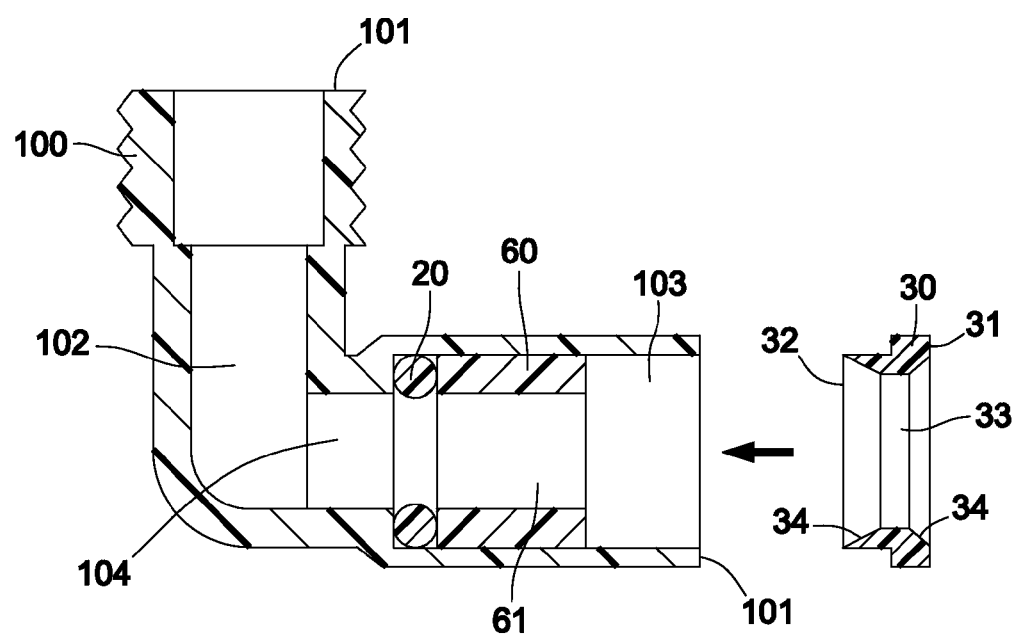
FIG. 25 is the third assembly view for a pipe fitting in the present invention.

Please refer to FIGS. 20 through 23 and FIGS. 4 through 8. The "leakage-free pipe fitting of quick connection" for Reverse Osmosis Membrane (RO) water treatment unit of household of the present invention comprises a pipe fitting 100, a sealing O-ring 20, an annular cooperative bushing collar 30, a cylindrical elastic sleeving collet 40, an accessory latching clip 50 with a cantilevered lug, and an annular reinforcing bolster 60, wherein:

Said pipe fitting 100, which is unitarily extruded in one piece by plastics molding into tubular fitting with two coupling unions 101, includes a hollow water passage 102, a cylindrical retainer 103 and a cylindrical docking receptacle 104 such that one coupling union 101 encloses the cylindrical retainer 103 therein while the circumferences of another coupling unions 101 have male threads formed thereon, and the cylindrical docking receptacle 104 runs through the cylindrical retainer 103 in communicable with the hollow water passage 102, wherein the internal diameter d5 of the cylindrical retainer 103 is greater than the aperture d6 of the cylindrical docking receptacle 104 (FIG. 23);

Said sealing O-ring 20 is made of rubber to be inserted against the inner bottom wall of the cylindrical retainer 103 in the pipe fitting 100 such that whose outer diameter is equivalent to or slightly greater than the internal diameter of the cylindrical retainer 103 in the pipe fitting 100 while whose internal diameter is slightly less than the internal diameter of the cylindrical docking receptacle 104 in the pipe fitting 100 (FIG. 24);

Said annular cooperative bushing collar 30, which is unitarily extruded in one piece by plastics molding into two-stair tiered hollow cylinder to be partially slid into the coupling union 101 on the cylindrical retainer 103 of the pipe fitting 100 by means of glue-bonding or high frequency melt-bonding method, includes a top surface 31, a bottom surface 32, a jointing circular through-hole 33 running through the top surface 31 and bottom surface 32, and a guiding conical flare 34 respectively created along each rim of the top surface 31 and bottom surface 32 such that outer diameter of top stair rim abutting top surface 31 is greater than outer diameter of bottom stair rim abutting bottom surface 32 (FIG. 25);

Said cylindrical elastic sleeving collet 40, which is unitarily extruded in one piece by plastics molding into hollow cylinder to be slid into the jointing circular through-hole 33 of the annular cooperative bushing collar 30, includes a peripheral gorgerin 43 integrating a top surface 41 and a bottom surface 42 with a circular sliding through hole 44 running through therein, an annular cambered locking flange 45 abutting the bottom surface 42 and an annular delimiting flange 46 abutting the top surface 41 as well as a plurality of longitudinal hooping slits 47 created along the bottom surface 42 in circumferentially equivalent-spaced manner to be communicable with the circular sliding through hole 44, and a plurality of elastic griping ribs 48 created between two adjacent longitudinal hooping slit 47 in circumferentially equivalent-spaced manner, wherein the outer diameter d1 of the peripheral gorgerin 43 is smaller than the internal diameter d2 of the jointing circular through-hole 33 in the annular cooperative bushing collar 30, the outer diameter d3 of the annular cambered locking flange 45 is greater than the internal diameter d2 of the jointing circular through-hole 33 in the annular cooperative bushing collar 30 and the outer diameter d4 of the annular delimiting flange 46 is greater than the internal diameter d3 of the annular cambered locking flange 45 (FIGS. 4 and 6);

Said accessory latching clip 50, which is unitarily extruded in one piece by plastics molding into planiform collar served as clamping means for assembled pipe fitting, includes a U-shaped nick 51 with two prong of appendix legs encompassing central cut nick such that the width h between two legs of the U-shaped nick 51 is slightly greater than the outer diameter d1 of the peripheral gorgerin 43 in the cylindrical elastic sleeving collet 40 (FIG. 8); and Said annular reinforcing bolster 60, which is unitarily extruded in one piece by plastics molding or metal material by lathing process or casting process into cylinder to be inserted into the cylindrical retainer 103 of the pipe fitting 100 in a sandwich position between the sealing O-ring 20 and the bottom surface 42 of the cylindrical elastic sleeving collet 40, includes an inner bore 61 with aperture d7 and a circumference 62 with outer diameter d8 such that the aperture d7 of the inner bore 61 equals the aperture d6 of the cylindrical docking receptacle 104 in the pipe fitting 100 while the outer diameter d8 of the circumference 62 equals the internal diameter d5 of the cylindrical retainer 103 in the pipe fitting 100 (FIG. 21).

Wherein, the pipe fitting 100 can be adapted into "– (minus) type" with two coupling unions 101, "T (Tee) type" or "Y (wye) type" with three coupling unions 101, or "+ (plus) type" with four coupling unions 101.

Figure 3:
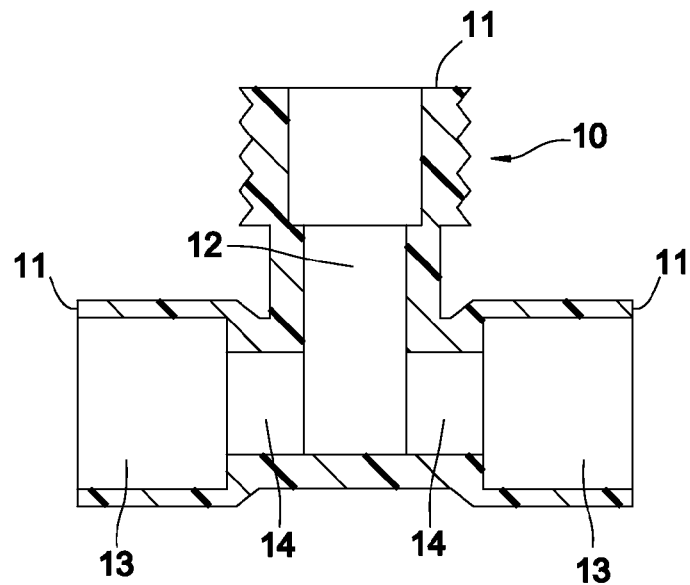
FIG. 3 is a cross sectional view for showing a pipe fitting of T (Tee) inserting type in another embodiment.
Figure 5:
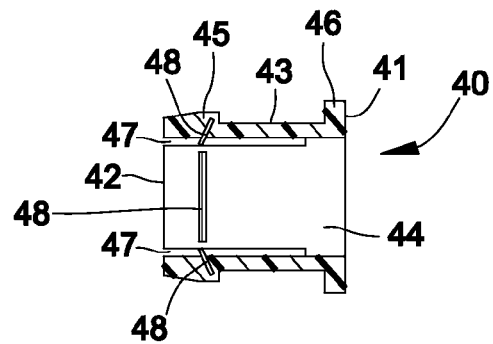
FIG. 5 is a cross sectional view taken from the 5-5 section line of previous FIG. 1 for showing a cylindrical elastic sleeving collet.

The pipe fitting of "T (Tee) type" or "Y (wye) type" with three coupling unions 101, which are configured as that each coupling union 101 is disposed on each end of T trunks, and communicable with a common hollow water passage 102 as shown in FIG. 3, includes a pair of cylindrical retainers 103 and a cylindrical docking receptacle 104 such that each coupling union 101 on the horizontal trunk encloses each corresponding cylindrical retainer 103 therein, and the cylindrical docking receptacle 104 runs through the pair cylindrical retainers 103 in communicable with the hollow water passage 102, wherein the internal diameter of each cylindrical retainer 103 is greater than the aperture of the cylindrical docking receptacle 104 (FIG. 3).

The pipe fitting of "– (minus) type" with two coupling unions 101 includes a hollow water passage 102, a cylindrical retainer 103 and a cylindrical docking receptacle 104 such that one coupling union 101 encloses the cylindrical retainer 103 therein, and the cylindrical docking receptacle 104 runs through the cylindrical retainer 103 in communicable with the hollow water passage 102, wherein the internal diameter of the cylindrical retainer 103 is greater than the aperture of the cylindrical docking receptacle 104.

The pipe fitting of "+(plus) type" with four coupling unions 101, which are configured as that each coupling union 101 is disposed on each end of + trunks, and communicable with a common hollow water passage 102, includes a pair of cylindrical retainers 103 and a cylindrical docking receptacle 104 such that each coupling union 101 on the horizontal trunk encloses each corresponding cylindrical retainer 103 therein, and the cylindrical docking receptacle 104 runs through the pair cylindrical retainers 103 in communicable with the hollow water passage 102, wherein, the internal diameter of each cylindrical retainer 103 is greater than the aperture of the cylindrical docking receptacle 104.

Figure 22:
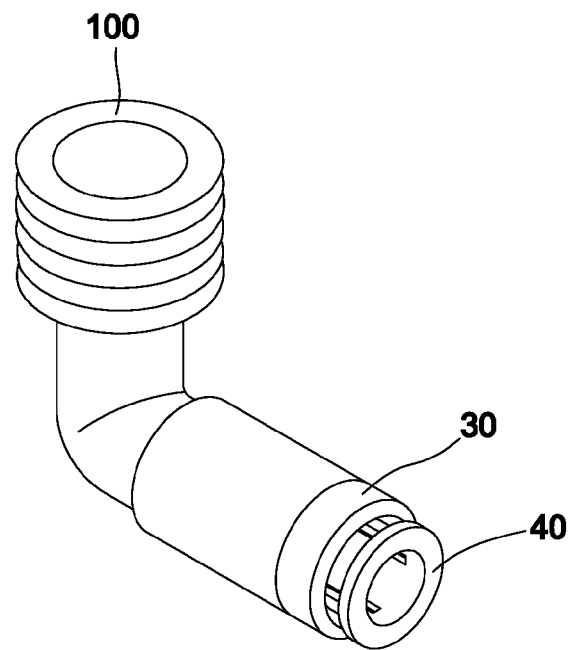
FIG. 22 is a perspective assembly view for a pipe fitting in the present invention.
Figure 26:
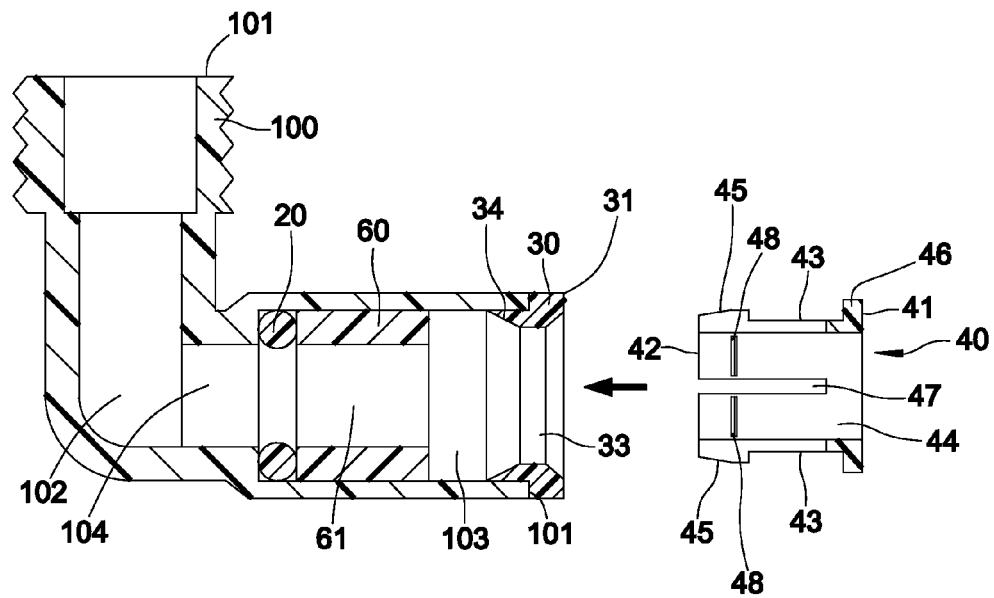
FIG. 26 is the fourth assembly view for a pipe fitting in the present invention.

Please further refer to FIGS. 22 through 27. The assembling steps for the "leakage-free pipe fitting of quick connection" for Reverse Osmosis Membrane (RO) water treatment unit of household of the present invention are shown as below.

a. Insert the sealing O-ring 20 into the cylindrical retainer 103 in the pipe fitting 100 to the thorough end such that the sealing O-ring 20 contacts against the inner bottom wall of the cylindrical retainer 103 (FIGS. 23 and 24).

b. Insert the annular reinforcing bolster 60 into the cylindrical retainer 103 in the pipe fitting 100 up to the forward end thereof closely contact against the sealing O-ring 20 (FIGS. 24 and 25).

c. Facing the bottom surface 32 of the annular cooperative bushing collar 30 towards the cylindrical retainer 103 of the pipe fitting 100, insert the annular cooperative bushing collar 30 into the cylindrical retainer 103 of the pipe fitting 100 (FIG. 25), then securely fix the annular cooperative bushing collar 30 onto the coupling union 101 of the pipe fitting 100 by means of glue-bonding or high frequency melt-bonding method (FIG. 26).

d. Facing the bottom surface 42 of the cylindrical elastic sleeving collet 40 towards the jointing circular through-hole 33 of the annular cooperative bushing collar 30, forcibly push the annular cambered locking flange 45 of the cylindrical elastic sleeving collet 40 forwardly to pass it through the jointing circular through-hole 33 of the annular cooperative bushing collar 30 to finish the assembly for the "leakage-free pipe fitting of quick connection" of the present invention (FIGS. 22 and 27).

Figure 27:
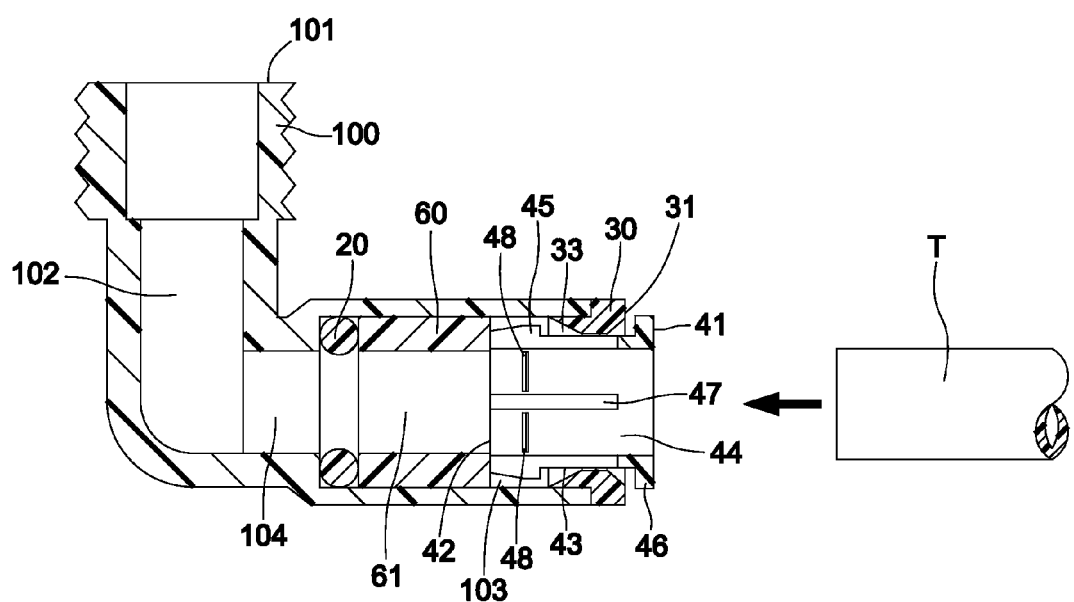
FIG. 27 is the first schematic view showing the coupling of water pipe with a pipe fitting in the present invention.
Figure 28:
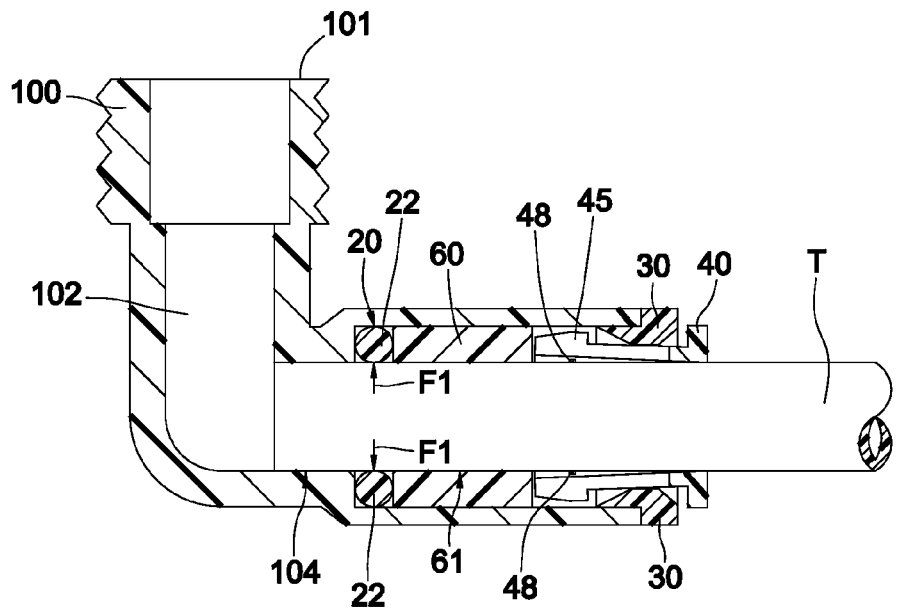
FIG. 28 is the second schematic view showing the coupling of water pipe with a pipe fitting in the present invention.
Figure 29:
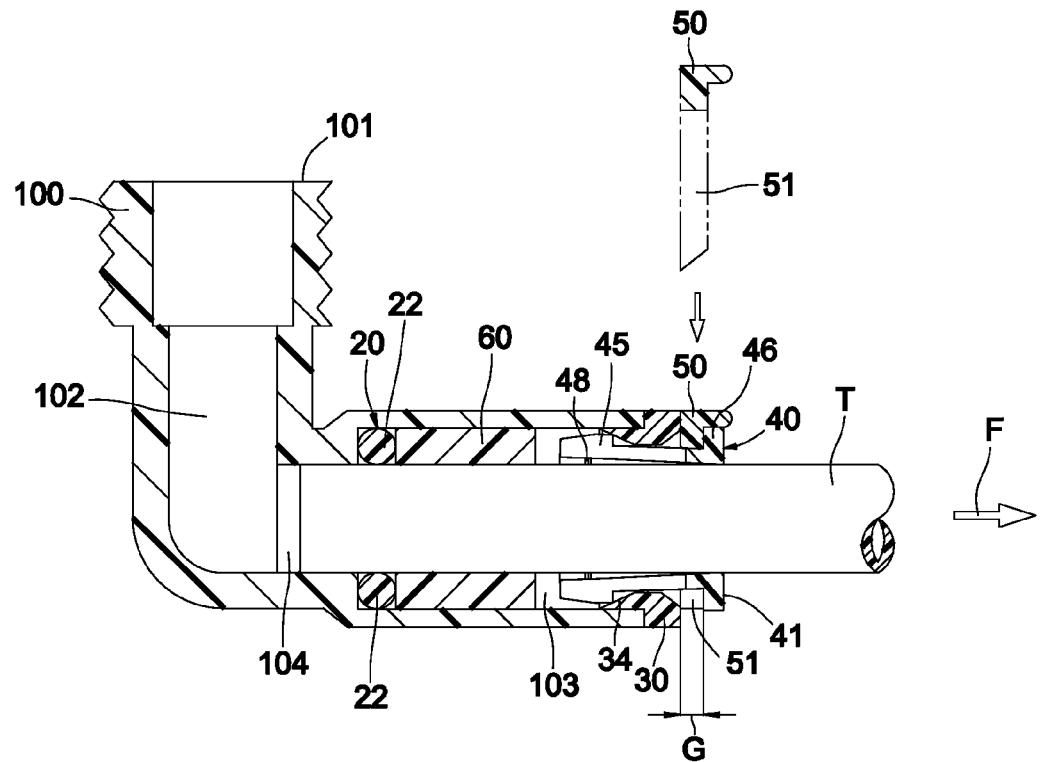
FIG. 29 is the third schematic view showing the coupling of water pipe with a pipe fitting in the present invention.

Please refer to FIGS. 27 through 29. The mutually jointing steps between the "leakage-free pipe fitting of quick connection" for Reverse Osmosis Membrane (RO) water treatment unit of household of the present invention and the water pipe are shown as below.

A. Align and insert a water pipe T into the circular sliding through hole 44 in the top surface 41 of the cylindrical elastic sleeving collet 40 (FIG. 27), then force the water pipe T orderly pass through the circular sliding through hole 44 of the cylindrical elastic sleeving collet 40, the inner bore 61 of the annular reinforcing bolster 60 and the inner bore of the sealing O-ring 20 up to the cylindrical docking receptacle 104 of the pipe fitting 100 (FIG. 28). At this moment, the water pipe T is firmly sleeved by the elastic griping ribs 48 of the circular sliding through hole 44 in the cylindrical elastic sleeving collet 40, and the sealing O-ring 20 is under symmetrically isometric deformed by the compressing force F1 caused by the outer wall of the water pipe T so that a leakage-free effect due to closely contact between the water pipe T and the cylindrical docking receptacle 14 of the pipe fitting 10 is created, wherein (FIG. 28) is a cross sectional view showing a symmetrically isometric deformation 22 of the sealing O-ring 20, which becomes oval shape.

B. hold exposed section of the water pipe T outside of the cylindrical elastic sleeving collet 40, then pull it outwards along the top surface 41 of the cylindrical elastic sleeving collet 40 so that the cylindrical elastic sleeving collet 40 with annular delimiting flange 46 is simultaneously drawn outwards with a certain displacement force F due to securely clamping of the cylindrical elastic sleeving collet 40 onto the outer wall of the water pipe T. Thereby, the outwardly drawn annular delimiting flange 46 detaches off the annular cooperative bushing collar 3 to create a clearance G against the top surface 31 of the annular cooperative bushing collar 30 with same displacement as that of the cylindrical elastic sleeving collet 40 (referential G in FIG. 29).

C. Align the U-shaped nick 51 of the accessory latching clip 50 with the clearance G in the step B, then thoroughly inset the accessory latching clip 50 up to the inner hemispherical bottom of the U-shaped nick 51 contacts against the peripheral gorgerin 43 of the cylindrical elastic sleeving collet 40 so that the cylindrical elastic sleeving collet 40 is tightly fixed in stable manner without free moving possibility in the jointing circular through-hole 33 of the annular cooperative bushing collar 30 to complete the mutually jointing procedure between the "leakage-free pipe fitting of quick connection" of the present invention and the water pipe T (FIG. 29). Thus, the mutually jointing procedure between the "leakage-free pipe fitting of quick connection" of the present invention and the water pipe T does not change core in the mutually jointing procedure between the conventional pipe fittings of inserting type and the water pipe T so that the quick connecting feature thereof is remained.

Figure 31:
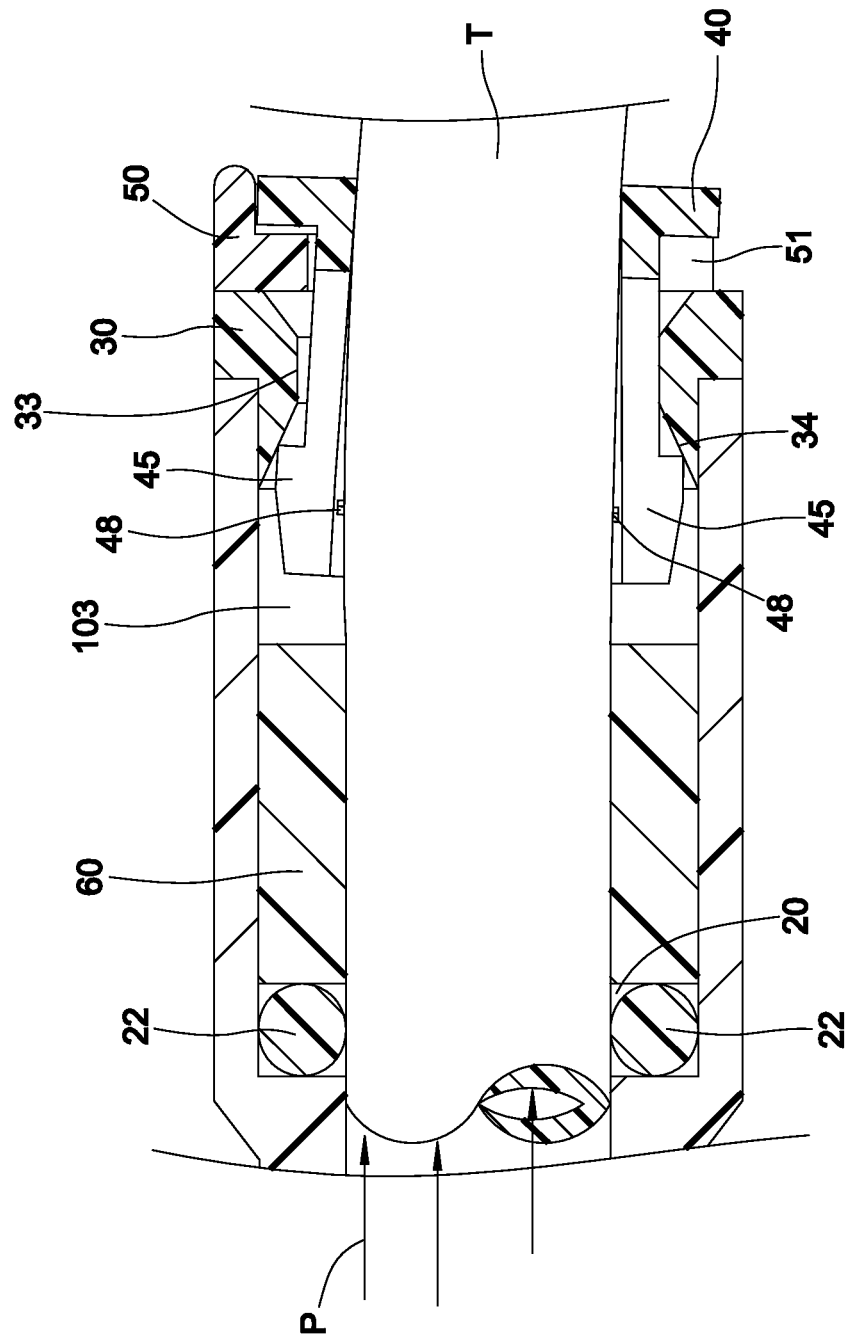
FIG. 31 is a cross section schematic view showing the morphological status of coupled water pipe in a pipe fitting of the present invention without leakage of compressed water therein after being deformed by bending force.

Please refer to FIGS. 30 and 31. Even the water pipe T is bent towards the opening of the U-shaped nick 51 in the accessory latching clip 50 by a bending force Fc (FIGS. 18 and 19), a partial section of the annular delimiting flange 46, which is corresponding to the opening of the U-shaped nick 51, will lose support from the accessory latching clip 50. With the annular reinforcing bolster 60 sandwiched between the sealing O-ring 20 and the cylindrical elastic sleeving collet 40, a partial section of the peripheral gorgerin 43 in corresponding to the arrowhead of bending force Fc will keep closely contact with the inner wall of the jointing circular through-hole 33 while another partial section of the peripheral gorgerin 43 in opposed to the arrowhead of bending force Fc will detach the inner wall of the jointing circular through-hole 33 to create a gap G2 (FIG. 30).

Figure 15:
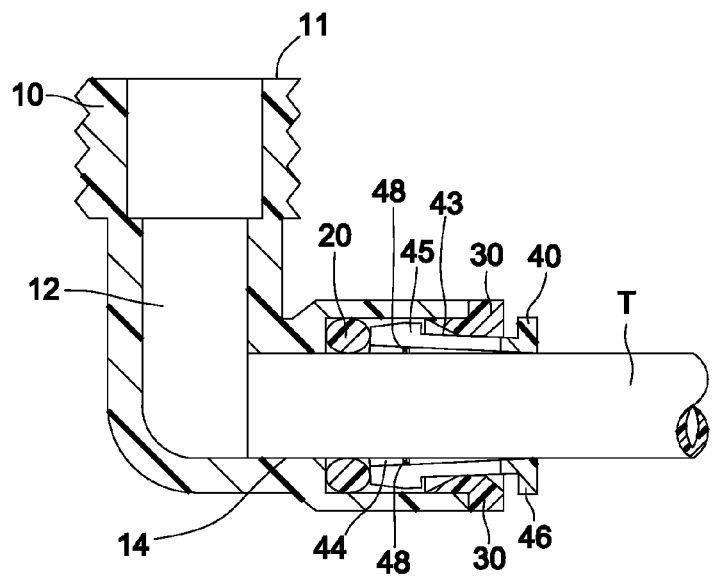
FIG. 15 is the second schematic view showing the coupling of water pipe with conventional pipe fitting.
Figure 16:
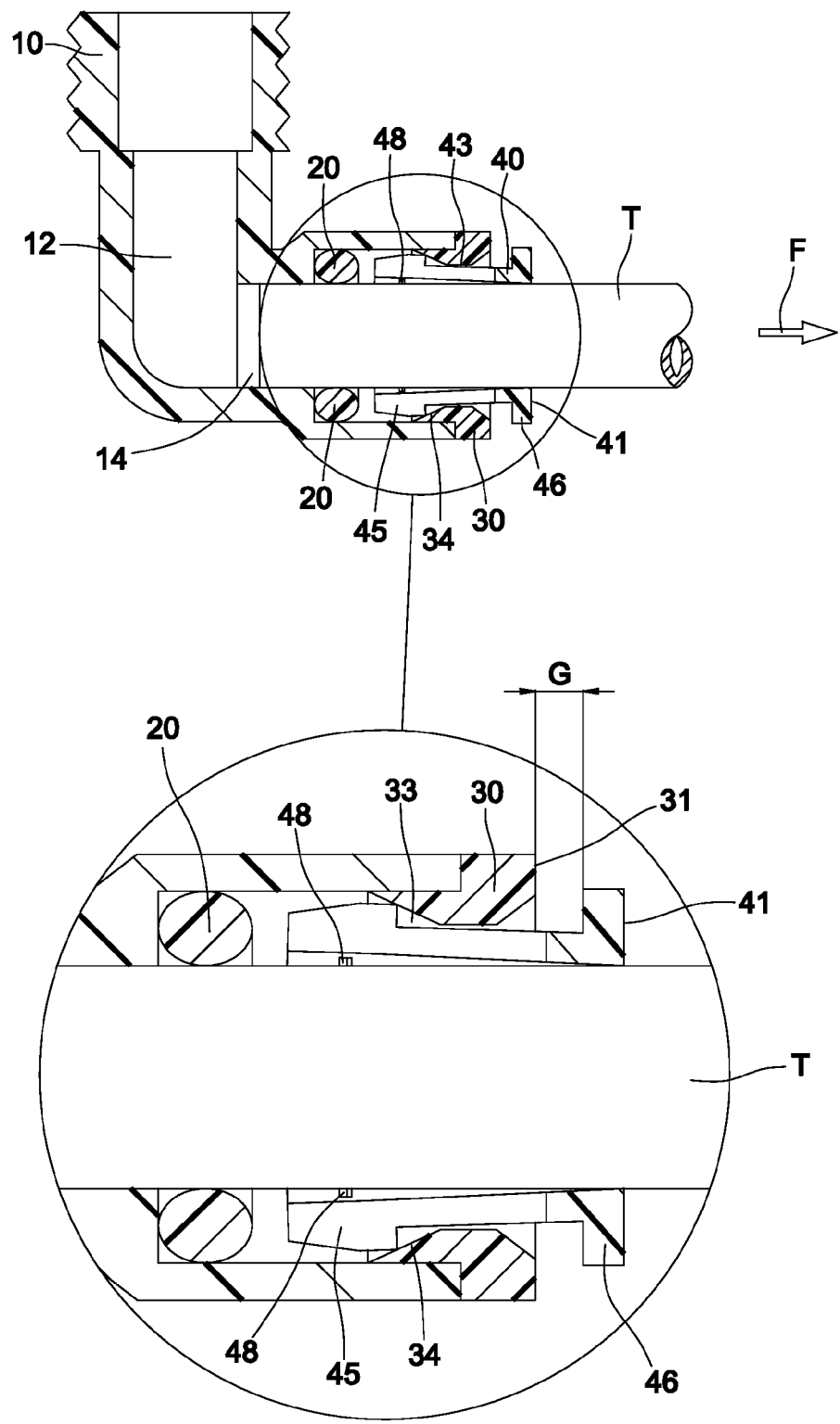
FIG. 16 is the third schematic view showing the coupling of water pipe with conventional pipe fitting.
Figure 17:
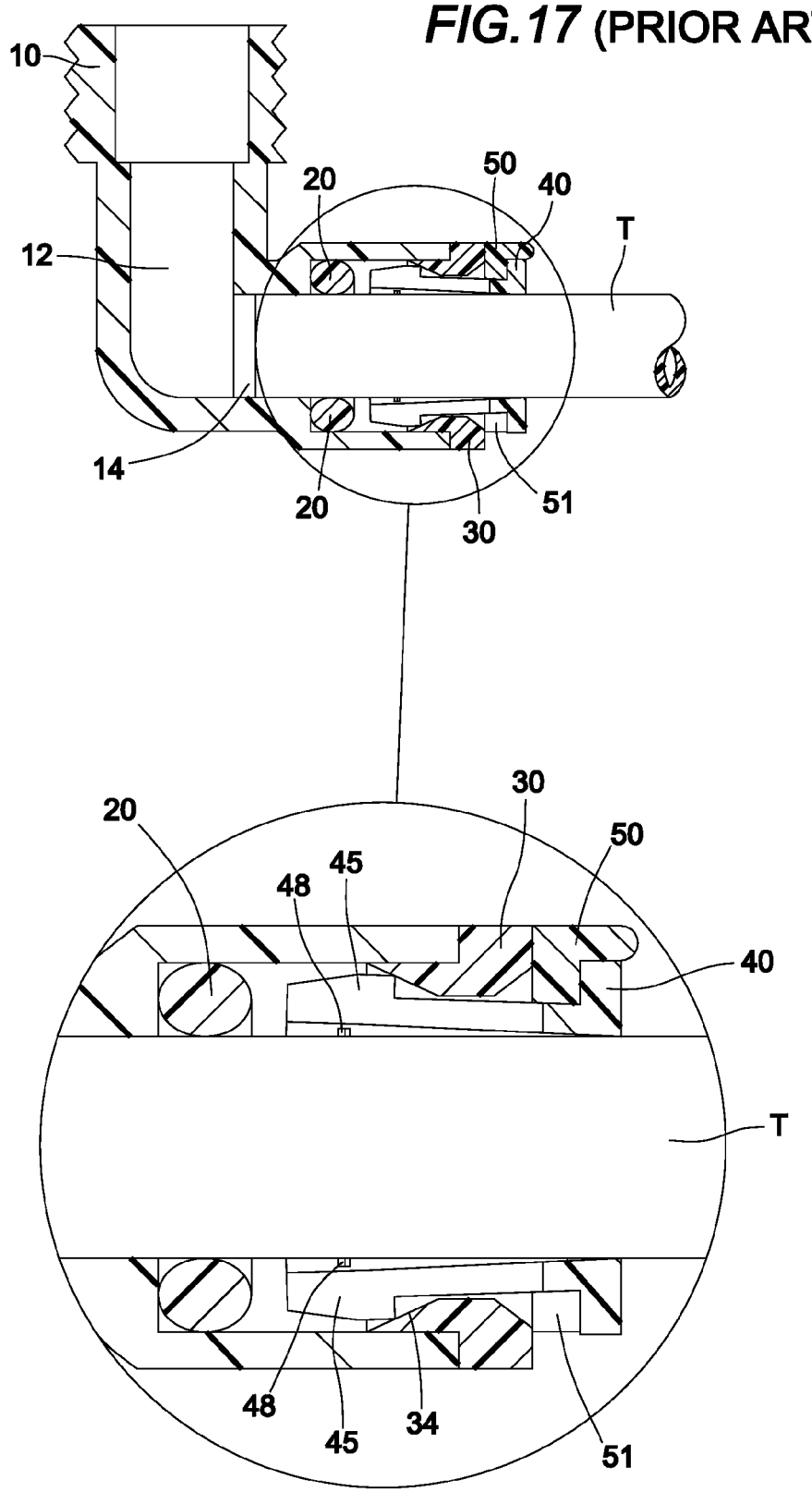
FIG. 17 is the fourth schematic view showing the coupling of water pipe with conventional pipe fitting.

With the annular reinforcing bolster 60 sandwiched between the sealing O-ring 20 and the cylindrical elastic sleeving collet 40, the annular delimiting flange 46 of the cylindrical elastic sleeving collet 40 is no more suffered from uneven stress from the water pipe T because the sealing O-ring 20 and the water pipe T in the cylindrical docking receptacle 104 of the pipe fitting 100 are firmly sleeved and propped by the inner bore 61 of the annular reinforcing bolster 60 therein. Thereby, without uneven stress from the water pipe T, the original symmetrically isometric deformation 22 (FIG. 15-a) of the sealing O-ring 20 will be remained as shown in FIG. 30 and associated partially magnified view. Therefore, no matter which way of the water pipe T bent caused by the orientation of bending force Fc, under the sleeving and propping effect of the annular reinforcing bolster 60, the even closely sealing effect of the sealing O-ring 20 over the outer wall of the water pipe T is unaffected.

Thus, no more compressed water P in the water pipe T can be seeped out via partial section of bad sealing effect of the sealing O-ring 20 in asymmetrically non-isometric deformation. Consequently, no more seeping compressed water P can be leaked out of the cylindrical elastic sleeving collet 40 to spread over the circuit cabling or compressed pump of the RO water treatment unit so that the serious leakage drawback in the water pipe fitting of quick connection is completely solved (FIG. 31).

In conclusion of all disclosures heretofore, a novel gadget of annular reinforcing bolster 60 is cleverly applied in the present invention to solve serious leakage drawback in the water pipe fittings of inserting type. It meets the criterion of patentability because it has industrial applicability in addition to the novelty for the popular pipe fittings of inserting type. Therefore, we submit the patent application in accordance with related patent laws.

What is claimed is:

1. A leakage-free pipe fitting of quick connection for a Reverse Osmosis Membrane (RO) water treatment unit of a household comprises:

a pipe fitting, a sealing O-ring, an annular cooperative bushing collar, a cylindrical elastic sleeving collet, an accessory latching clip with a cantilevered lug, and an annular reinforcing bolster, wherein said pipe fitting, which is a unitarily extruded plastics molded tubular fitting, comprises at least two coupling unions, a hollow water passage, a cylindrical retainer and a cylindrical docking receptacle such that one coupling union encloses the cylindrical retainer therein, the cylindrical docking receptacle runs through the cylindrical retainer in communication with the hollow water passage, and an internal diameter of the cylindrical retainer is greater than an aperture of the cylindrical docking receptacle;

wherein said sealing O-ring is made of rubber and is inserted against an inner bottom wall of the cylindrical retainer in the pipe fitting such that an outer diameter of the O-ring is equivalent to or greater than the internal diameter of the cylindrical retainer in the pipe fitting while an internal diameter of the O-Ring is less than an internal diameter of the cylindrical docking receptacle in the pipe fitting;

wherein said annular cooperative bushing collar, which is a unitarily extruded piece of plastics molding forming a two-stair tiered hollow cylinder that is partially slid into the one coupling union having the cylindrical retainer of the pipe fitting, includes a top surface, a bottom surface, a jointing circular through-hole running through the top surface and bottom surface, and a guiding conical flare respectively created along rims of the top surface and the bottom surface such that an outer diameter of a top stair rim abutting top surface is greater than an outer diameter of a bottom stair rim abutting bottom surface;

wherein said cylindrical elastic sleeving collet, which is a unitarily extruded piece of plastics molding forming a hollow cylinder that is slid into the jointing circular through-hole of the annular cooperative bushing collar, includes a peripheral gorgerin integrating a top surface and a bottom surface with a circular sliding through hole running through therein, an annular cambered locking flange abutting the bottom surface, an annular delimiting flange abutting the top surface, a plurality of longitudinal hooping slits that are circumferentially equivalent-spaced along the bottom surface and extend towards the top surface and in communication with the circular sliding through hole, and a plurality of elastic gripping ribs created between two adjacent longitudinal hooping slits, wherein an outer diameter of the peripheral gorgerin is smaller than an internal diameter of the jointing circular through-hole in the annular cooperative bushing collar, an outer diameter of the annular cambered locking flange is greater than the internal diameter of the jointing circular through-hole in the annular cooperative bushing collar and an outer diameter of the annular delimiting flange is greater than an internal diameter of the annular cambered locking flange;

wherein said accessory latching clip, which is a unitarily extruded piece of plastics molding forming a planiform collar that clamps the assembled pipe fitting, includes a U-shaped nick with two prongs of appendix legs encompassing a central cut nick such that a width between the two legs of the U-shaped nick is greater than the outer diameter of the peripheral gorgerin in the cylindrical elastic sleeving collet;

wherein said annular reinforcing bolster, which is a unitarily extruded piece of plastics molding forming a cylinder that is inserted into the cylindrical retainer of the pipe fitting in a sandwich position between the sealing O-ring and the bottom surface of the cylindrical elastic sleeving collet, includes an inner bore with an aperture and a circumference with an outer diameter such that the aperture of the inner bore has a diameter equal to a diameter of the aperture of the cylindrical docking receptacle in the pipe fitting while the outer diameter of the circumference equals the internal diameter of the cylindrical retainer in the pipe fitting; and wherein the leakage-free pipe fitting having the annular reinforcing bolster sandwiched between the cylindrical docking receptacle in the pipe fitting and the sealing O-ring is configured in a way such that when a water pipe is inserted into the pipe fitting, the water pipe is closely propped and sleeved in a symmetrical manner so that a bad and uneven sealing effect is not incurred by an asymmetrically non-isometric deformation of the sealing O-ring when the water pipe is bent.

2. The leakage-free pipe fitting of quick connection as recited in claim 1, wherein said annular reinforcing bolster is made of a metal material by a lathing process or a casting process.

3. The leakage-free pipe fitting of quick connection as recited in claim 1, wherein the annular cooperative bushing collar is fixed to the one coupling union by gluing or melting.

* * * * *